(12) United States Patent
Bovington et al.

(10) Patent No.: US 12,092,858 B2
(45) Date of Patent: *Sep. 17, 2024

(54) PLUGGABLE OPTICAL MODULES WITH BLIND MATE OPTICAL CONNECTORS

(71) Applicant: Cisco Technology, Inc., San Jose, CA (US)

(72) Inventors: Jock T. Bovington, Koenigstein Im Taunus (DE); Matthew J. Traverso, Saratoga, CA (US); Mark C. Nowell, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,198

(22) Filed: Jan. 23, 2023

(65) Prior Publication Data

US 2023/0161098 A1   May 25, 2023

Related U.S. Application Data

(63) Continuation of application No. 17/446,013, filed on Aug. 26, 2021, now Pat. No. 11,614,578.

(60) Provisional application No. 63/199,825, filed on Jan. 27, 2021.

(51) Int. Cl.
| | |
|---|---|
| *F21V 8/00* | (2006.01) |
| *G02B 6/12* | (2006.01) |
| *G02B 6/38* | (2006.01) |
| *G02B 6/42* | (2006.01) |

(52) U.S. Cl.
CPC .............. *G02B 6/0083* (2013.01); *G02B 6/12* (2013.01); *G02B 6/3863* (2013.01); *G02B 6/4249* (2013.01)

(58) Field of Classification Search
CPC ...... G02B 6/0083; G02B 6/12; G02B 6/3863; G02B 6/4249; G02B 6/4284; G02B 6/4292; G02B 6/43; G02B 6/428
See application file for complete search history.

(56) References Cited

U.S. PATENT DOCUMENTS

| | | | | |
|---|---|---|---|---|
| 4,597,631 A | * | 7/1986 | Flores ................... | G02B 6/389 385/59 |
| 6,305,848 B1 | * | 10/2001 | Gregory ............... | G02B 6/4292 385/88 |
| 6,845,184 B1 | * | 1/2005 | Yoshimura ............. | H01L 23/48 385/9 |
| 8,606,112 B2 | * | 12/2013 | Tosetti ................... | H04B 10/40 398/115 |

(Continued)

*Primary Examiner* — Andrew Jordan
(74) *Attorney, Agent, or Firm* — Patterson + Sheridan, LLP (57) ABSTRACT

Aspects include a pluggable optical device and related optical system. The pluggable optical device comprises a housing, a printed circuit board (PCB) within the housing, and one or more blind mate optical connectors attached to the PCB along a first end of the PCB. The pluggable optical device further comprises one or more electrical contacts of the PCB near the first end, one or more external optical connectors arranged near a second end of the PCB opposite the first end, and one or more optical components attached to the PCB and included in optical paths extending between the one or more external optical connectors and the one or more blind mate optical connectors.

20 Claims, 10 Drawing Sheets

(56) References Cited

U.S. PATENT DOCUMENTS

| | | | | |
|---|---|---|---|---|
| 8,821,033 | B2 * | 9/2014 | Rosenberg | G02B 6/38 |
| | | | | 385/71 |
| 9,116,313 | B2 * | 8/2015 | Traverso | G02B 6/4284 |
| 10,473,871 | B2 * | 11/2019 | Leigh | G02B 6/4292 |
| 10,571,635 | B1 * | 2/2020 | Leigh | H04Q 11/0005 |
| 10,795,096 | B1 * | 10/2020 | Leigh | G02B 6/3883 |
| 11,249,266 | B2 * | 2/2022 | Mazzini | H04B 10/801 |
| 11,300,738 | B2 * | 4/2022 | Leigh | G02B 6/4261 |
| 11,320,588 | B1 * | 5/2022 | Mazed | G16H 10/40 |
| 11,374,655 | B1 * | 6/2022 | Mazzini | H04B 10/40 |
| 11,614,578 | B2 * | 3/2023 | Bovington | G02B 6/4249 |
| | | | | 385/92 |
| 2009/0097803 | A1 * | 4/2009 | Yeo | G02B 6/43 |
| | | | | 361/803 |
| 2010/0081303 | A1 * | 4/2010 | Roth | G02B 6/3817 |
| | | | | 439/607.03 |
| 2011/0268390 | A1 * | 11/2011 | Yi | G02B 6/4201 |
| | | | | 385/50 |
| 2013/0202253 | A1 * | 8/2013 | Rosenberg | G02B 6/38 |
| | | | | 385/70 |
| 2014/0321817 | A1 * | 10/2014 | Wang | H01S 5/0234 |
| | | | | 385/89 |
| 2015/0180578 | A1 * | 6/2015 | Leigh | G02B 6/4293 |
| | | | | 398/135 |
| 2015/0323754 | A1 * | 11/2015 | Leigh | G02B 6/4293 |
| | | | | 385/14 |
| 2016/0285215 | A1 * | 9/2016 | Little | G02B 6/3897 |
| 2016/0334594 | A1 * | 11/2016 | Leigh | G02B 6/4269 |
| 2016/0337727 | A1 * | 11/2016 | Graves | G02B 6/32 |
| 2017/0164518 | A1 * | 6/2017 | Morgan | G02B 6/43 |
| 2019/0132994 | A1 * | 5/2019 | Johnson | H01R 13/6581 |
| 2020/0073061 | A1 * | 3/2020 | Leigh | H04Q 11/0005 |
| 2020/0150364 | A1 * | 5/2020 | Leigh | G02B 6/4261 |
| 2020/0153515 | A1 * | 5/2020 | Goergen | G01J 1/4257 |
| 2020/0382220 | A1 * | 12/2020 | Leigh | G02B 6/4266 |
| 2021/0013653 | A1 * | 1/2021 | Sasaki | H05K 7/20409 |
| 2021/0044356 | A1 * | 2/2021 | Aboagye | G02B 6/423 |
| 2021/0075188 | A1 * | 3/2021 | Tomita | H04B 10/61 |
| 2021/0311269 | A1 * | 10/2021 | Goergen | G02B 6/423 |
| 2021/0311270 | A1 * | 10/2021 | Goergen | G02B 6/4214 |
| 2022/0236477 | A1 * | 7/2022 | Bovington | G02B 6/3863 |
| 2022/0263586 | A1 * | 8/2022 | Winzer | H04B 10/801 |
| 2022/0365288 | A1 * | 11/2022 | Wong | G02B 6/3851 |
| 2023/0161098 | A1 * | 5/2023 | Bovington | G02B 6/4249 |
| | | | | 385/92 |

* cited by examiner

PLUGGABLE OPTICAL MODULES WITH BLIND MATE OPTICAL CONNECTORS

CROSS-REFERENCE TO RELATED APPLICATIONS

This application is a continuation of co-pending U.S. patent application Ser. No. 17/446,013, filed Aug. 26, 2021, which claims benefit of U.S. provisional patent application Ser. No. 63/199,825, filed Jan. 27, 2021. The aforementioned related patent application is herein incorporated by reference in its entirety.

TECHNICAL FIELD

Embodiments presented in this disclosure generally relate to co-packaged optics (CPO) applications, and more specifically, to pluggable optical modules for CPO applications.

BACKGROUND

Co-packaged optics (CPO) applications have the potential for lower power and lower cost implementations, but tighter integration of the optics tends to create some operational challenges. For traditional CPO applications, users tend to have reduced flexibility for optical interfaces after the installation of the network equipment. Lasers, commonly used with CPO applications, may also present thermal challenges when co-located with other optical hardware. Further, the lasers can pose a reliability risk, which tends to compound within increasing numbers of lasers.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a pluggable optical device comprising a housing, a printed circuit board (PCB) within the housing, and one or more blind mate optical connectors attached to the PCB along a first end of the PCB. The pluggable optical device further comprises one or more electrical contacts of the PCB near the first end, one or more external optical connectors arranged near a second end of the PCB opposite the first end, and one or more optical components attached to the PCB and included in optical paths extending between the one or more external optical connectors and the one or more blind mate optical connectors.

Another embodiment presented in this disclosure is an optical system comprising a printed circuit board (PCB), a photonic integrated circuit (IC) attached to the PCB, and a cage attached to the PCB along a first end of the PCB. The cage is configured to receive a pluggable optical device. The optical system further comprises a connector assembly configured to, when the pluggable optical device is received in the cage, couple with a plurality of blind mate optical connectors arranged along a second end of a pluggable optical device. One or more optical components of the pluggable optical device are coupled with the photonic IC. When the pluggable optical device is received in the cage, the connector assembly is further configured to couple with one or more electrical contacts arranged near the second end.

EXAMPLE EMBODIMENTS

Embodiments discussed herein includes a pluggable optical device (also referred to as a "pluggable optical module") comprising a housing, a printed circuit board (PCB) within the housing, one or more blind mate optical connectors attached to the PCB along a first end of the PCB, and one or more electrical contacts of the PCB near the first end. The pluggable optical device further comprises one or more external optical connectors attached to the PCB along a second end of the PCB opposite the first end, and one or more optical components attached to the PCB. The one or more optical components are included in optical paths extending between the one or more external optical connectors and the one or more blind mate optical connectors.

The blind mate optical connector(s) may be attached to a top side of the PCB, and the electrical contact(s) may be arranged at a bottom side of the PCB. In some embodiments, the electrical contact(s) comprise an edge connector configured to couple with elastically-biased contact(s) of a host device. As the pluggable optical device is plugged into the host device, the mechanical housing (or cage) of the host device, in conjunction with the housing of the pluggable optical module, ensures that the optical connector(s) are suitably engaged as the electrical contact(s) are also engaged. The electrical contact(s) may communicate power and/or signals between the host device and the pluggable optical device. For example, the electrical contact(s) may be USB-style or other suitable configuration to deliver power and management signals to the pluggable optical device.

The pluggable optical device may be configured to operate as a laser module unit (including one or more remote laser sources), an optical conditioning unit that provides one or more optical functions to optical signals carried through the pluggable optical device on optical fibers, or a hybrid laser module and optical conditioning unit. Beneficially, using remote laser source(s) in the pluggable optical device addresses heating concerns by spacing the remote laser source(s) away from other optical hardware of the CPO, and allows the remote laser source(s) to be easily replaced to address reliability concerns.

The electrical connector(s) and optical connector(s) of the pluggable optical device are arranged to enable high system density, e.g., stacking of multiple pluggable optical modules. The high system density supports existing system integration techniques for power and cooling. The pluggable optical device and host device may use any suitable dimensioning, whether standardized dimensioning such as Quad Small Form-Factor Pluggable Double Density (QSFP-DD), Octal Small Form-Factor Pluggable (OSFP), or proprietary dimensioning.

A conventional pluggable form factor device used as a laser source for a co-packaged optics-based system may include electrical connectors on the host side of the PCB, and an external optical connector arranged at the faceplate. The conventional pluggable optical device provides optical energy (e.g., power and/or signals) to the host device through the external optical connector, a patchcord, and another connector at the faceplate. Beneficially, by including the blind mate optical connector(s), the pluggable optical device preserves faceplate area for other functions (additional pluggable optical devices, air intakes, etc.) and tends to have lower optical losses overall.

Figure 1:
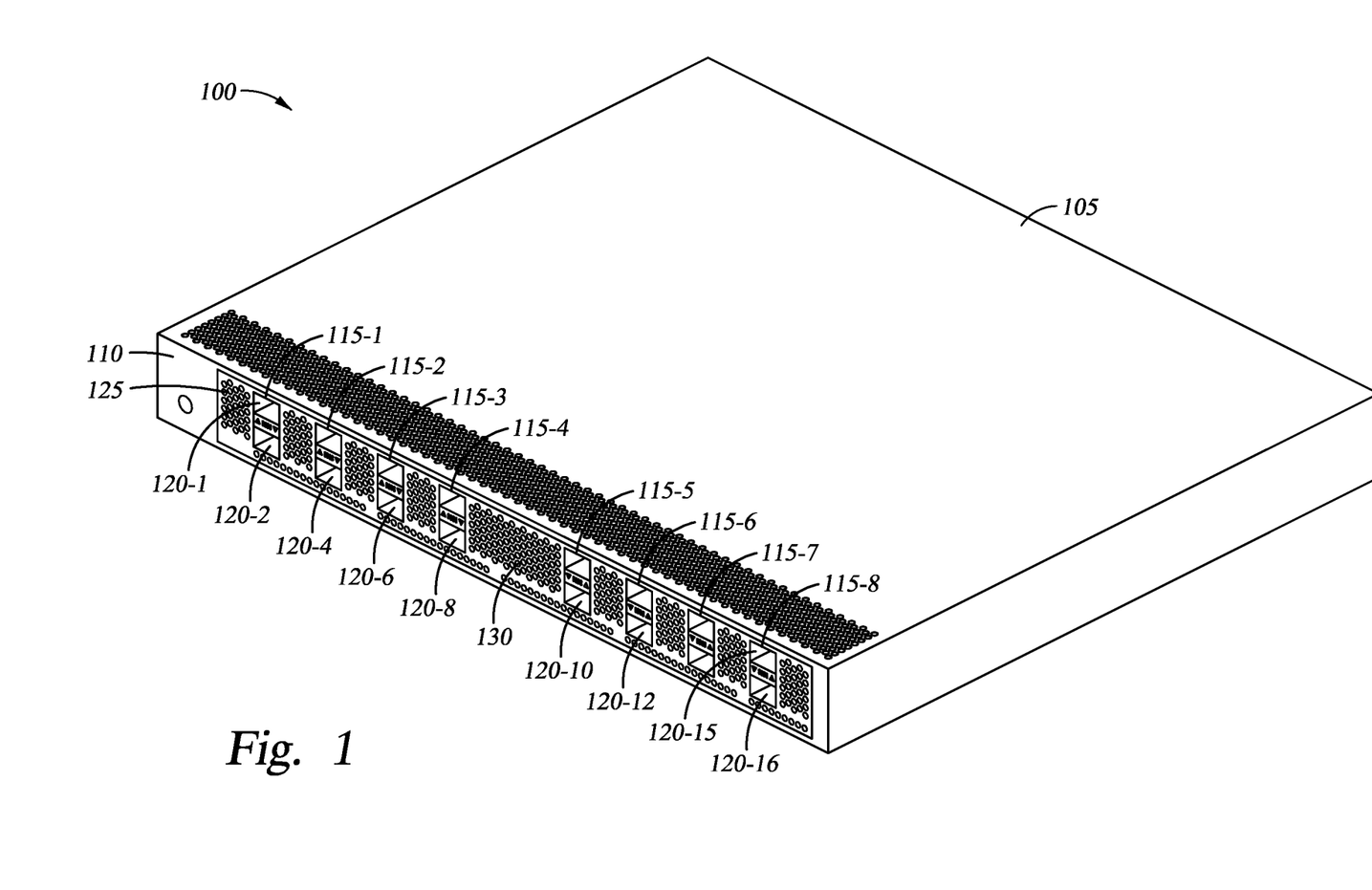
FIG. 1 is a network device supporting multiple pluggable optical modules, according to one or more embodiments.

FIG. 1 is a network device 100 supporting multiple pluggable optical modules, according to one or more embodiments. The network device 100 may be a CPO device providing any suitable networking functionality, such as switching or routing.

The network device 100 comprises a housing 105 within which components of the network device 100 are housed. The housing 105 may be formed of any suitable material(s) and may have any suitable dimensioning. In some embodiments, the housing 105 has a standardized dimensioning such that the network device 100 is rack-mountable.

In some embodiments, the housing 105 comprises a system PCB (or host PCB) that includes electronic components and optical components, and that couples with pluggable optical devices that are plugged into openings 120-1, 120-2, ..., 120-16, which are defined by a faceplate 110 of the housing 105. The openings 120-1, 120-2, ..., 120-16 are arranged as pairs 115-1, 115-2, ..., 115-8 in a "stacked" configuration (as shown, a vertical arrangement of the respective openings 120-1, 120-2, ..., 120-16). In this way, the network device 100 may support a stacked configuration of pluggable optical devices with each pair 115-1, 115-2, ..., 115-8

The faceplate 110 further defines multiple air intakes 125, 130 that support air flow through the housing 105 to remove heat from the various components of the network device 100. In some embodiments, the network device 100 further comprises one or more fans that draw air into the housing 105 through the air intakes 125, 130. The air intakes 125, 130 may have any suitable dimensioning and arrangement. For example, the air intake 125 between pairs 115-1, 115-2 has a first sizing, and the air intake between 115-4, 115-5 has a second sizing greater than the first sizing. As shown, the air intake 130 has a central position on the faceplate 110 while the air intakes 125 are between adjacent pairs 115-1, 115-2, ..., 115-8 away from the central position.

Figure 2:
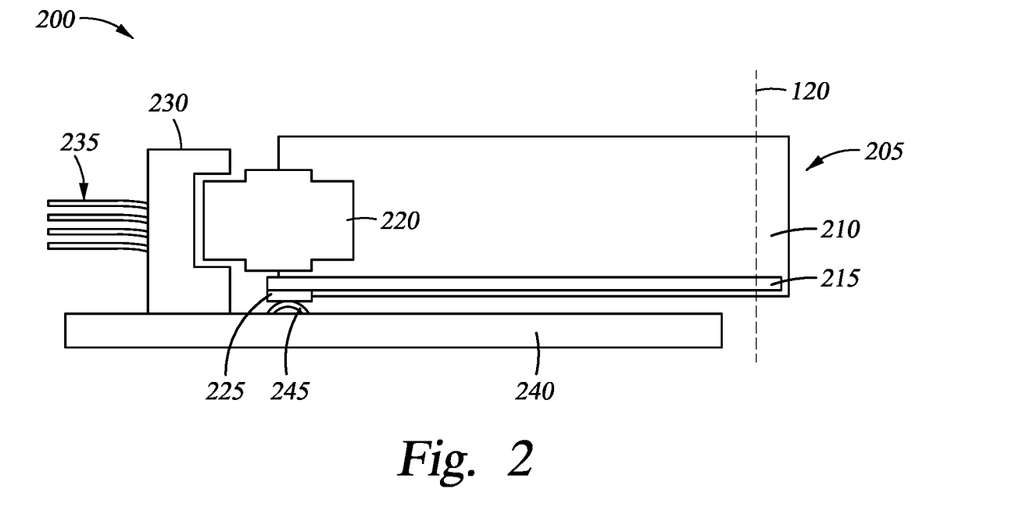
FIG. 2 illustrates coupling a pluggable optical module with a network device, according to one or more embodiments.

FIG. 2 illustrates coupling a pluggable optical module with a network device, according to one or more embodiments. The features illustrated in diagram 200 may be used in conjunction with other embodiments, e.g., using the network device 100 of FIG. 1.

In the diagram 200, a pluggable optical module 205 is inserted into an opening 120 of the network device (also referred to as a "host device"). The openings 120-1, 120-2, ..., 120-16 of FIG. 1 may be considered instances of the opening 120. The pluggable optical module 205 comprises a housing 210, a PCB 215 within the housing 210, one or more blind mate optical connectors 220 attached to the PCB 215 along a first end of the PCB 215 (e.g., a lead edge of the PCB 215 as inserted into the opening 120), and one or more electrical contacts 225 attached to the PCB 215 near the first end. In some embodiments, the network device provides electrical power and/or signals to the pluggable optical module 205 using the one or more electrical contacts 225.

The housing 210 may have any suitable dimensioning for being received into the opening 120. Although not shown, the network device may include a cage or other structure that is dimensioned to receive the pluggable optical module 205 therein. In some embodiments, the housing 210 is contoured to slide into and out of the network device through the opening 120. The housing 210 may have a standardized dimensioning (e.g., to comply with QSFP-DD), or may have a proprietary dimensioning.

The one or more blind mate optical connectors 220 and the one or more electrical contacts 225 may have any suitable dimensioning. Some non-limiting examples of the blind mate optical connector(s) 220 include Mechanical Transfer (MT), Multiple-Fiber Push-On/Pull-Off (MPO, MTP), SN, and so forth. In some embodiments, each of the blind mate optical connector(s) 220 comprises one or more ferrules that couple with a plurality of optical fibers. In some embodiments, the one or more electrical contacts 225 comprise an edge connector having one or more conductive traces.

In some embodiments, the one or more blind mate optical connectors 220 are attached to a top side of the PCB 215, and the one or more electrical contacts 225 are attached to a bottom side of the PCB 215. In some embodiments, the one or more electrical contacts 225 couple with electrical contacts 245 on the host device side, which in some cases may be elastically biased.

The host device comprises a host PCB 240, one or more connectors 230 attached to the host PCB 240, and one or more optical fibers 235 coupled with the connector 230. In some embodiments, each of the one or more connectors 230 is formed of a single component. In other embodiments, each of the one or more connectors 230 may be a connector assembly formed of multiple components. The one or more connectors 230 are configured to receive the one or more blind mate optical connectors 220, which aligns one or more optical components of the pluggable optical module 205 into a coupled configuration with the one or more optical fibers 235. In some embodiments, the one or more connectors 230 retain the one or more blind mate optical connectors 220 in the coupled configuration.

In the coupled configuration, the electrical contacts 245 are coupled with the one or more electrical contacts 225. In some embodiments, the compliance of the electrical contacts 245 (when elastically biased) accommodates the alignment of the one or more connectors 230 with the one or more blind mate optical connectors 220. As shown, the electrical contacts 245 are attached to the host PCB 240. In alternate implementations, the electrical contacts 245 are attached to the one or more connectors 230. The connector 230 may include electrical contacts on a bottom side of the connector 230 that couple with corresponding electrical contacts on a top side of the host PCB 240 when the connector 230 is attached to the host PCB 240.

Figure 3:
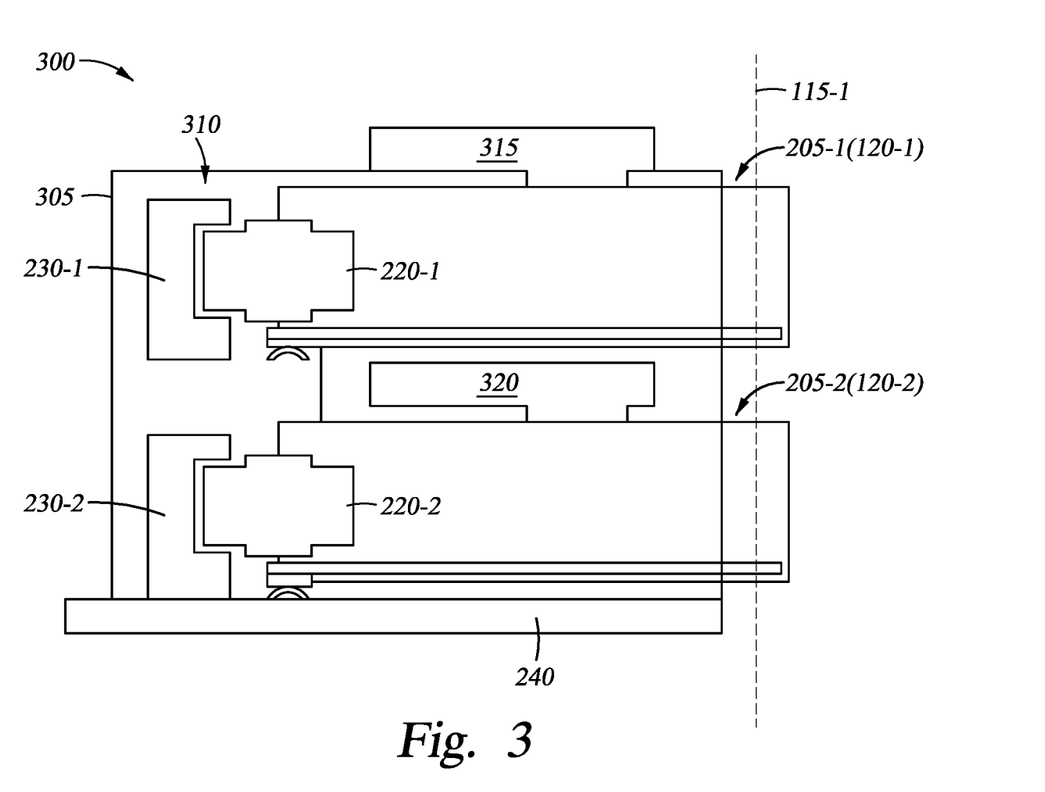
FIG. 3 illustrates coupling two pluggable optical modules in a stacked configuration with a network device, according to one or more embodiments.

FIG. 3 illustrates coupling two pluggable optical modules in a stacked configuration with a network device, according to one or more embodiments. The features illustrated in diagram 300 may be used in conjunction with other embodiments, e.g., using the network device 100 of FIG. 1.

In the diagram 300, a first pluggable optical module 205-1 is inserted into an upper opening 120-1 of the pair 115-1, and a second pluggable optical module 205-2 is inserted into a lower opening 120-2. The network device comprises a cage 305 that is attached to the host PCB 240, and that defines the upper opening 120-1 and the lower opening 120-2.

One or more additional components of the host device may be attached to the cage 305. In some embodiments, a connector assembly 310 is attached to the cage 305, and comprises a first connector 230-1 aligned with the upper opening 120-1, and a second connector 230-2 aligned with the lower opening 120-2. Each of the connectors 230-1, 230-2 represents one example of the connector 230 of FIG. 2, and in some cases may be similarly configured to each other. The connectors 230-1, 230-2 may be connected into the connector assembly 310 using any suitable techniques. In alternate embodiments, the first connector 230-1 and the second connector 230-2 are separate from each other.

A heat sink 315 is attached to a top of the cage 305 and extends partly into the interior volume of the cage 305. The heat sink 315 thermally couples with the first pluggable optical module 205-1, e.g., by contacting the top of the cage of the first pluggable optical module 205-1 when the first pluggable optical module 205-1 is inserted into the upper opening 120-1. A heat sink 320 is attached to the cage 305 and extends partly into the interior volume of the cage 305. The heat sink 320 thermally couples with the second pluggable optical module 205-2, e.g., by contacting the top of the cage of the second pluggable optical module 205-2 when the second pluggable optical module 205-2 is inserted into the lower opening 120-2. In some embodiments, the heat sink 315 is configured as a top heat sink, and the heat sink 320 is configured as an integrated riding heat sink.

Figure 4A:
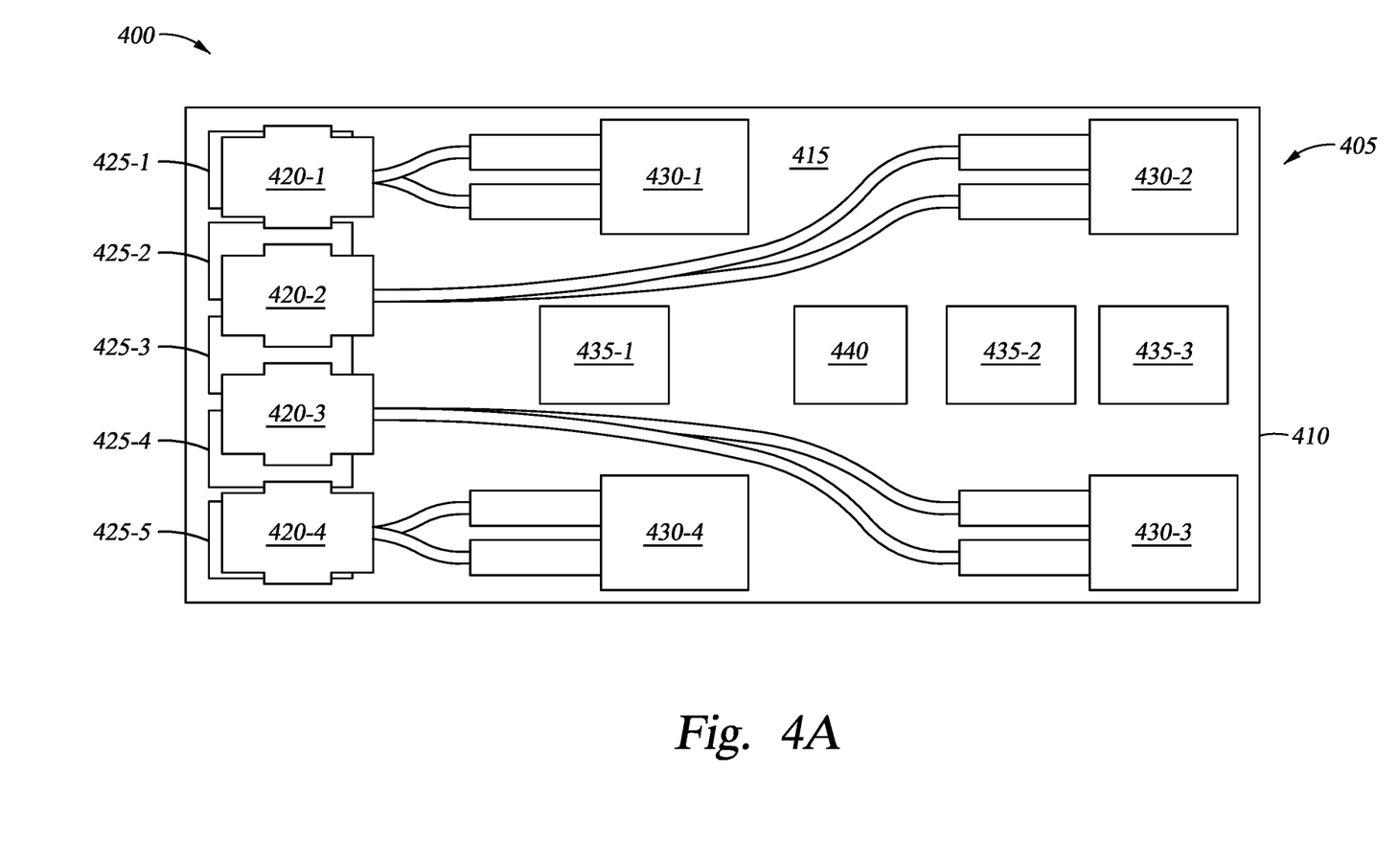
FIGS. 4A and 4B provide views of a pluggable optical module configured as a laser module unit with multiple remote laser sources, according to one or more embodiments.
Figure 4B:
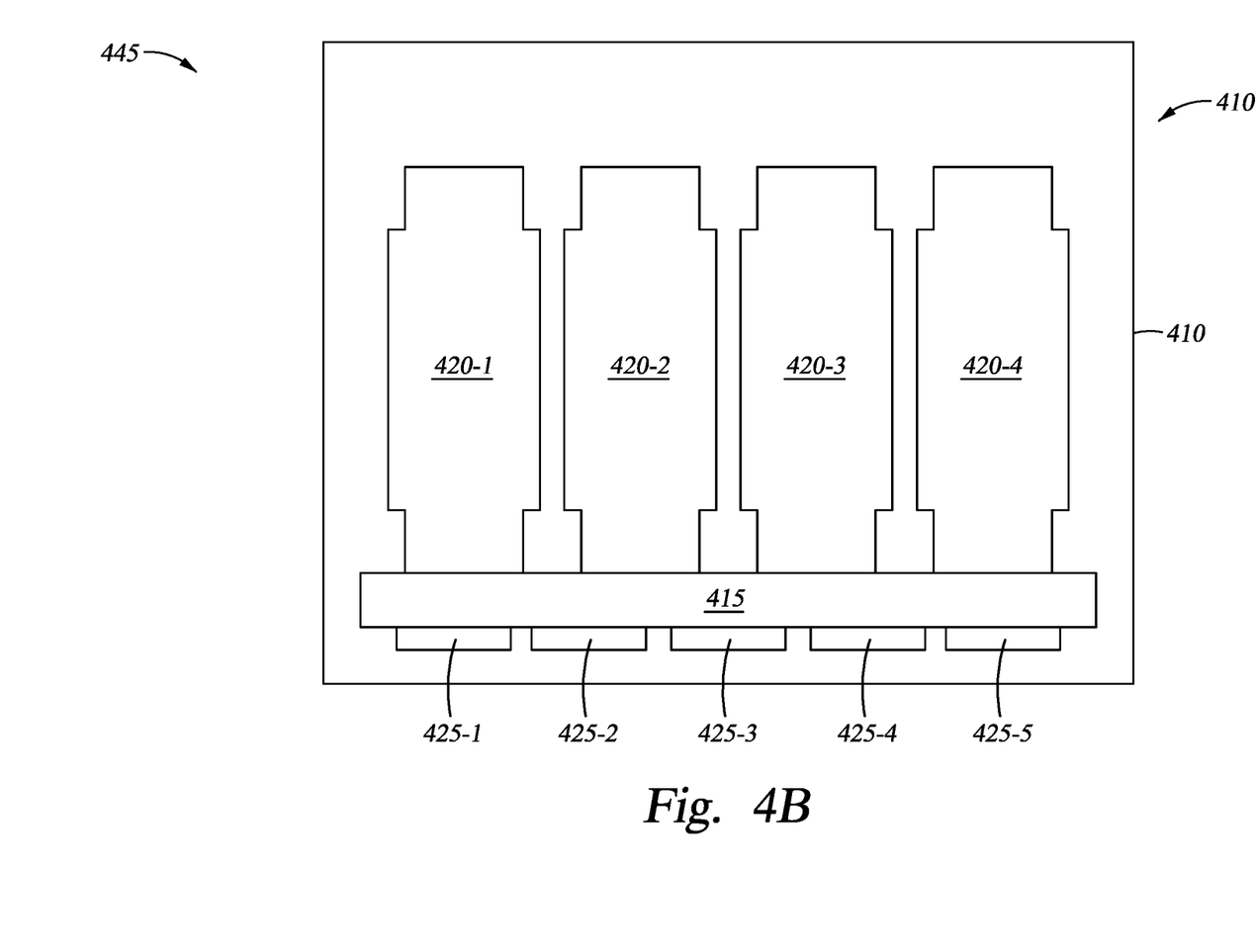

FIGS. 4A and 4B provide views of a pluggable optical module 405 configured as a laser module unit with multiple laser sources, according to one or more embodiments. More specifically, diagram 400 of FIG. 4A provides a top view of the pluggable optical module 405, and diagram 445 of FIG. 4B provides an end view of blind mate optical connectors 420-1, . . . , 420-4 of the pluggable optical module 405. The features illustrated in diagrams 400, 445 may be used in conjunction with other embodiments. For example, the pluggable optical module 405 represents one possible implementation of the pluggable optical module 205 of FIG. 2 and may be inserted into, e.g., the host devices illustrated in FIGS. 2 and 3.

In the diagram 400, the pluggable optical module 405 comprises a housing 410, and a PCB 415 arranged in the housing 410 and attached to the housing 410. The pluggable optical module 405 further comprises a plurality of blind mate optical connectors 420-1, . . . , 420-4 attached to a top side of the PCB 415 along a first end of the PCB 415, and a plurality of electrical contacts 425-1, . . . , 425-5 arranged at a bottom side of the PCB 415 near the first end. Although four (4) blind mate optical connectors 420-1, . . . , 420-4 and five (5) electrical contacts 425-1, . . . , 425-5 are shown, other numbers and placements of these are also contemplated. For example, the plurality of electrical contacts 425-1, . . . , 425-5 may be arranged at a top side of the PCB 415.

The pluggable optical module 405 further comprises a plurality of laser sources 430-1, 430-2, 430-3, 430-4 that receive electrical power provided by the host device via one or more of the electrical contacts 425-1, . . . , 425-5. The laser sources 430-1, 430-2, 430-3, 430-4 generate and deliver optical energy to the host device via the blind mate optical connectors 420-1, . . . , 420-4. As shown, the laser source 430-1 includes multiple laser channels coupled to the blind mate optical connector 420-1 via multiple optical fibers, the laser source 430-2 is coupled to the blind mate optical connector 420-2 via multiple optical fibers, and so forth.

The pluggable optical module 405 further comprises a plurality of electronic components that are attached to the PCB 415 and that receive the electrical power provided by the host device. As shown, the plurality of electronic components comprise a microcontroller 440 and three (3) DC-DC converters 435-1, 435-2, 435-3, although other arrangements of electronic components are also contemplated. In some embodiments, the DC-DC converters 435-1, 435-2, 435-3 convert a voltage level of the received electrical power to voltage levels suitable for the laser sources 430-1, 430-2, 430-3, 430-4. In some embodiments, the microcontroller 440 receives input signals from the host device via one or more of the electrical contacts 425-1, . . . , 425-4, and generates control signals to operate the DC-DC converters 435-1, 435-2, 435-3 and/or the laser sources 430-1, 430-2, 430-3, 430-4.

The plurality of laser sources 430-1, 430-2, 430-3, 430-4 and the plurality of electronic components may have any suitable arrangement on the PCB 415. As shown, the electronic components are generally arranged along a centerline of the PCB 415, and the laser sources 430-1, 430-2, 430-3, 430-4 are arranged laterally outward from the electronic components. Beneficially, the arrangement may support routing of the various optical fibers through the pluggable optical module 405.

The small form factor of the pluggable optical module 405 accommodates known system integration and thermal cooling techniques. As mentioned above, the pluggable optical module 405 is configured to operate as a laser module unit. The pluggable nature of the pluggable optical module 405 beneficially permits a degraded or failed laser source 430-1, 430-2, 430-3, 430-4 to be easily replaced (e.g., hot-swapped). Routing the optical energy from the laser sources 430-1, 430-2, 430-3, 430-4 to the blind mate optical connectors 420-1, . . . , 420-4 ensures that the pluggable optical module 405 is eye-safe to a user of the system. The blind mate optical connectors 420-1, . . . , 420-4 of the pluggable optical module 405 also provide lower optical losses, when compared with routing optical energy to the host device through external patchcords.

Figure 5A:
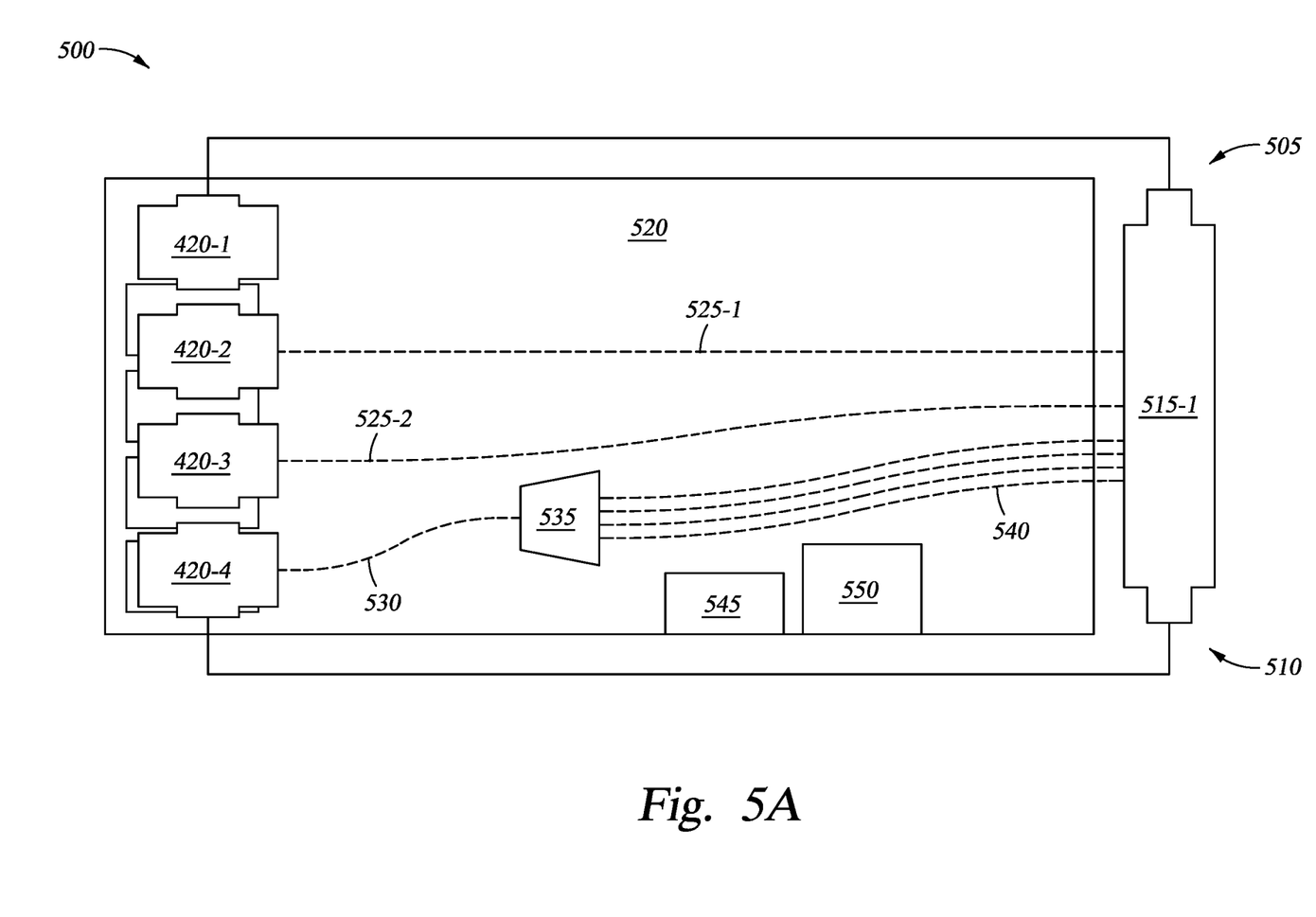
FIGS. 5A and 5B provide views of a pluggable optical module configured as an optical conditioning unit with a fanout device, according to one or more embodiments.
Figure 5B:
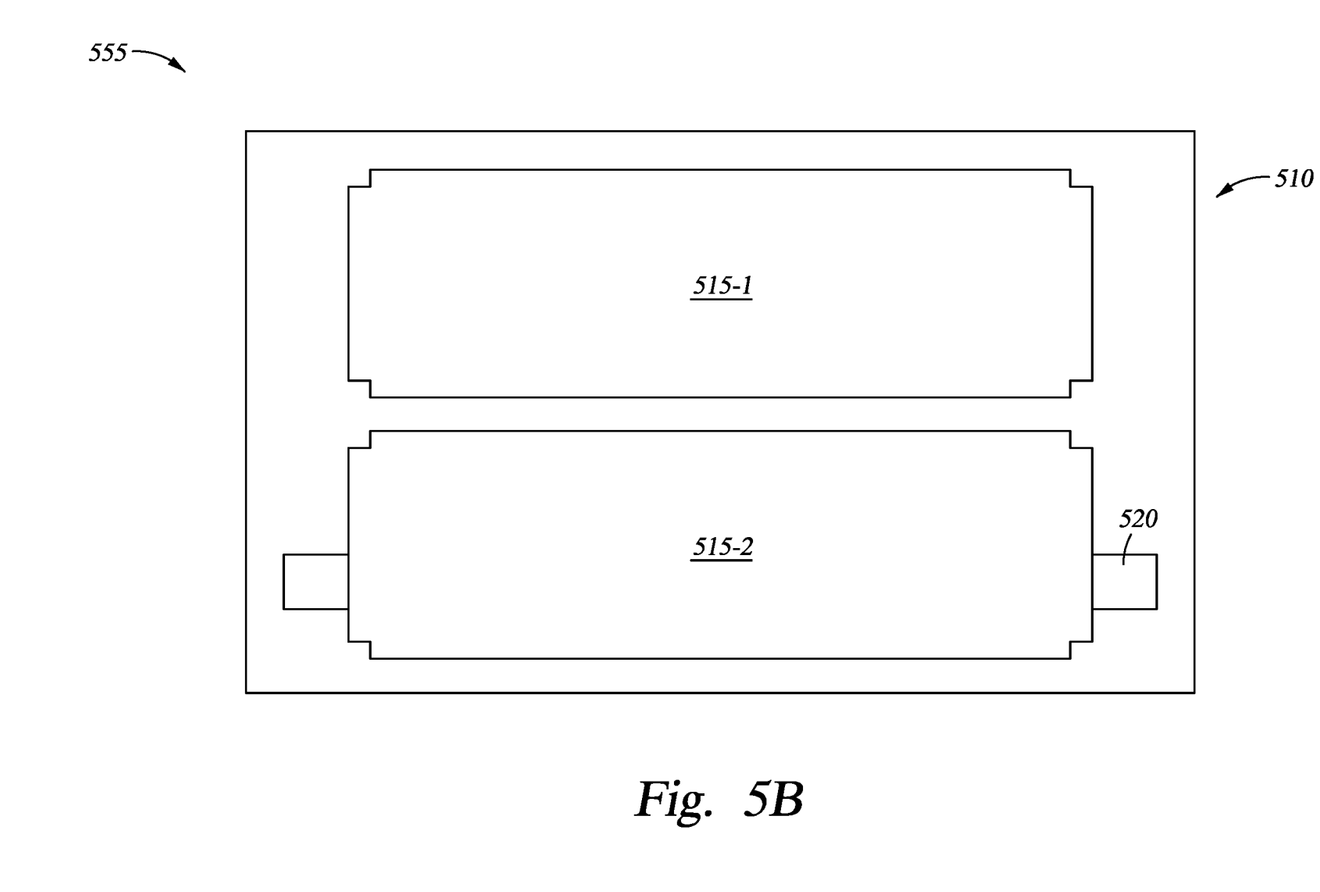

FIGS. 5A and 5B provide views of a pluggable optical module 505 configured as an optical conditioning unit with a fanout device 535, according to one or more embodiments. More specifically, diagram 500 of FIG. 5A provides a top view of the pluggable optical module 505, and diagram 555 of FIG. 5B provides an end view of external optical connectors 515-1, 515-2 of the pluggable optical module 505.

The features illustrated in diagrams 500, 555 may be used in conjunction with other embodiments. For example, the pluggable optical module 505 represents one possible implementation of the pluggable optical module 205 of FIG. 2 and may be inserted into, e.g., the host devices illustrated in FIGS. 2 and 3.

In the diagram 500, the pluggable optical module 505 comprises a housing 510, and a PCB 520 arranged in the housing 510 and attached to the housing 510. The pluggable optical module 505 further comprises the blind mate optical connectors 420-1, . . . , 420-4 attached to a top side of the PCB 520 along a first end of the PCB 520, and a plurality of electrical contacts 425-1, . . . , 425-5 arranged at a bottom side of the PCB 520 near the first end.

The pluggable optical module 505 further comprises two (2) external optical connectors 515-1, 515-2 arranged near a second end of the PCB 520 opposite the first end. As shown, the external optical connectors 515-1, 515-2 extend through the housing 510 and are in a stacked configuration. In alternate implementations, one or more of the external optical connectors 515-1, 515-2 may be attached to the PCB 520 near the second end. The external optical connectors 515-1, 515-2 may have any suitable dimensioning. Some non-limiting examples of the external optical connectors 515-1, 515-2 include Mechanical Transfer (MT), Multiple-Fiber Push-On/Pull-Off (MPO, MTP), SN, and so forth. In some embodiments, each of the external optical connectors 515-1, 515-2 comprises a plurality of ferrules that couple with a plurality of optical fibers.

The pluggable optical module 505 further comprises one or more optical components that are attached to the PCB 520 and that are included in optical paths extending between the one or more external optical connectors 515-1, 515-2 and the blind mate optical connectors 420-1, . . . , 420-4. As shown in the diagram 500, the one or more optical components comprise a fanout device 535.

Other optical components of the pluggable optical module 505 need not be attached to the PCB 520. For example, a plurality of single mode optical fibers 540 couples the fanout device 535 with a first connector 515-1 of the one or more external optical connectors 515-1, 515-2 and a multicore optical fiber 530 couples the fanout device 535 with a second connector 420-4 of the one or more blind mate optical connectors 420-1, . . . , 420-4. Additionally, one or more single mode optical fibers 525-1 extend between the external optical connectors 515-1 and the blind mate optical connector 420-2, and one or more single mode optical fibers 525-2 extend between the external optical connector 515-1 and the blind mate optical connector 420-3.

The pluggable optical module 505 further comprises a plurality of electronic components that are attached to the PCB 520 and that receive the electrical power provided by the host device. As shown, the plurality of electronic components comprise a microcontroller 550 and a DC-DC converter 545, although other arrangements of electronic components are also contemplated.

As mentioned above, the pluggable optical module 505 is configured to operate as an optical conditioning unit. While a single fanout device 535 is depicted for simplicity, the pluggable optical module 505 may comprise passive optical components and/or active optical components (i.e., that receive electrical power from the host device via one or more of the electrical contacts 425-1, . . . , 425-5) to provide any other suitable optical conditioning functionality. The optical conditioning may be performed on optical signals propagating through the pluggable optical module 505 in any direction (whether the optical signals are input at the external optical connectors 515-1, 515-2 or at the blind mate optical connectors 420-1, . . . , 420-4). In some embodiments, the pluggable optical module 505 comprises one or more active optical components, which comprise one or more of an optical amplifier, an optical attenuator, an optical filter, an optical dispersion controller, an optical multiplexer, an optical demultiplexer, an optical switch, and an optical repeater.

The small form factor of the pluggable optical module 505 accommodates known system integration and thermal cooling techniques. By including the external optical connectors 515-1, 515-2, the pluggable optical module 505 effectively permits the faceplate of the host device to be reconfigurable, allowing users to specify optical fiber connectors, pigtails, and so forth. Further, a higher density of the faceplate is made possible by the combination of the electrical contacts 425-1, . . . , 425-5 and the blind mate optical connectors 420-1, . . . , 420-4 at a same end of the pluggable optical module 505. Further, the pluggable optical module 505 provides a compact and protected optical fiber fanout functionality (or any suitable alternate optical conditioning functionality) that is also field replaceable.

Figure 6:
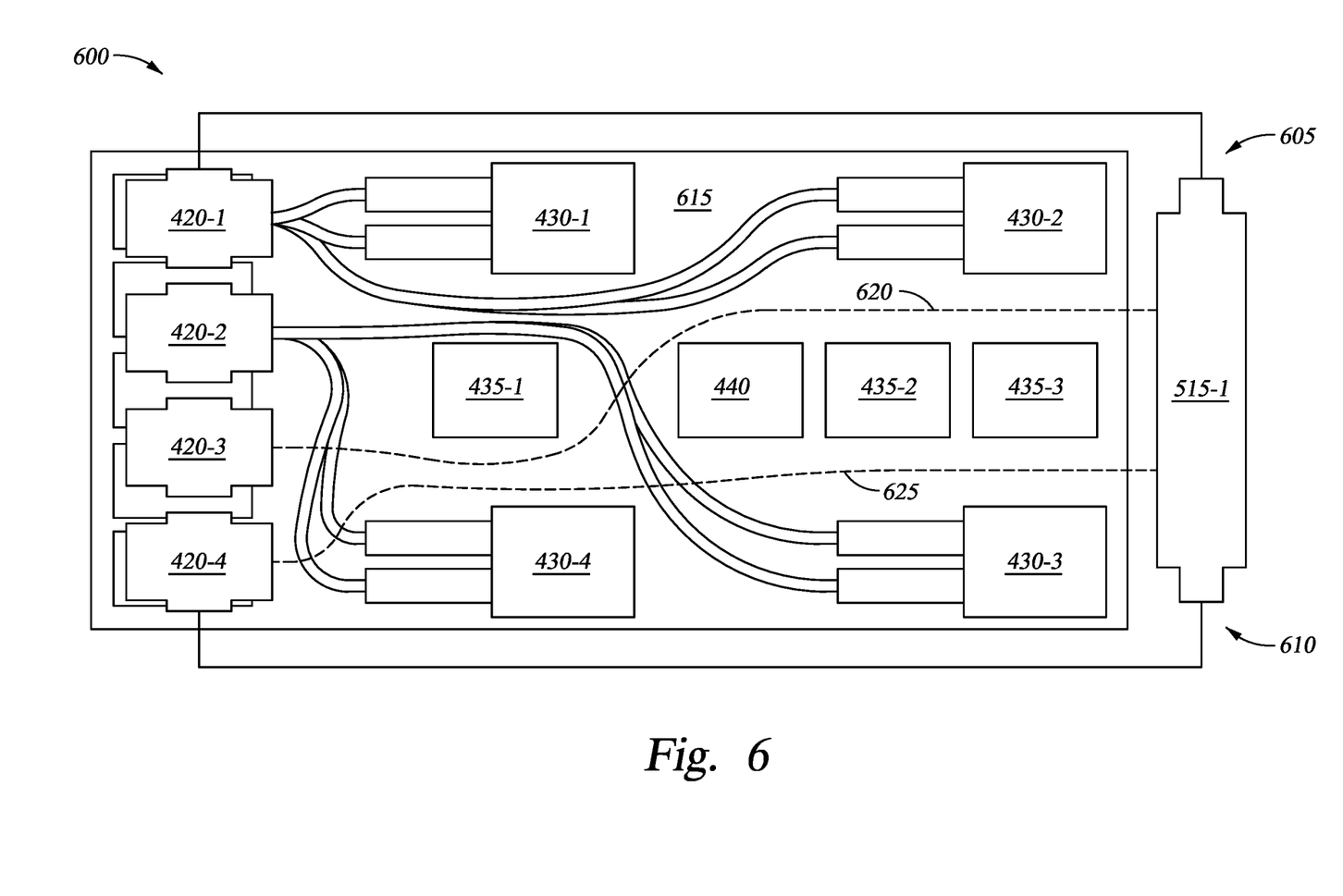
FIG. 6 provides a view of a pluggable optical module configured as a hybrid laser module and optical conditioning unit, according to one or more embodiments.

FIG. 6 provides a view of a pluggable optical module 605 configured as a hybrid laser module and optical conditioning unit, according to one or more embodiments. More specifically, the diagram 600 provides a top view of the pluggable optical module 605. The features illustrated in the diagrams 600 may be used in conjunction with other embodiments. For example, the pluggable optical module 605 represents one possible implementation of the pluggable optical module 205 of FIG. 2 and may be inserted into, e.g., the host devices illustrated in FIGS. 2 and 3.

In the diagram 600, the pluggable optical module 605 comprises a housing 610, and a PCB 615 arranged in the housing 610 and attached to the housing 610. The pluggable optical module 605 further comprises the blind mate optical connectors 420-1, . . . , 420-4 attached to a top side of the PCB 520 along a first end of the PCB 615, and a plurality of electrical contacts 425-1, . . . , 425-5 arranged at a bottom side of the PCB 615 near the first end.

The pluggable optical module 605 further comprises the plurality of laser sources 430-1, 430-2, 430-3, 430-4 that receive electrical power provided by the host device via one or more of the electrical contacts 425-1, . . . , 425-5. As shown, the laser sources 430-1, 430-2 each include multiple laser channels coupled to the blind mate optical connector 420-1 via multiple optical fibers, and the laser sources 430-3, 430-4 each include multiple laser channels coupled to the blind mate optical connector 420-2 via multiple optical fibers.

The pluggable optical module 405 further comprises a plurality of electronic components that are attached to the PCB 615: the microcontroller 440 and the DC-DC converters 435-1, 435-2, 435-3.

The pluggable optical module 605 further comprises two (2) external optical connectors 515-1, 515-2 arranged near a second end of the PCB 615 opposite the first end. Additionally, one or more single mode optical fibers 620 extend between the external optical connectors 515-1 and the blind mate optical connector 420-3, and one or more single mode optical fibers 625 extend between the external optical connector 515-1 and the blind mate optical connector 420-4. The pluggable optical module 605 may further comprise one or more optical components that are attached to the PCB 615 and that are included in optical paths extending between the one or more external optical connectors 515-1, 515-2 and the blind mate optical connectors 420-1, . . . , 420-4. The one or more optical components may provide any suitable optical conditioning functionality for the pluggable optical module 605.

Due to its hybrid nature, the pluggable optical module 605 provides the various benefits discussed above with respect to the pluggable optical modules 405, 505. Further, the integration of the laser sources 430-1, 430-2, 430-3, 430-4 in the pluggable optical module 605 with the electronic components and/or the optical components providing the optical conditioning functionality permits an even higher density of the faceplate.

Figure 7A:
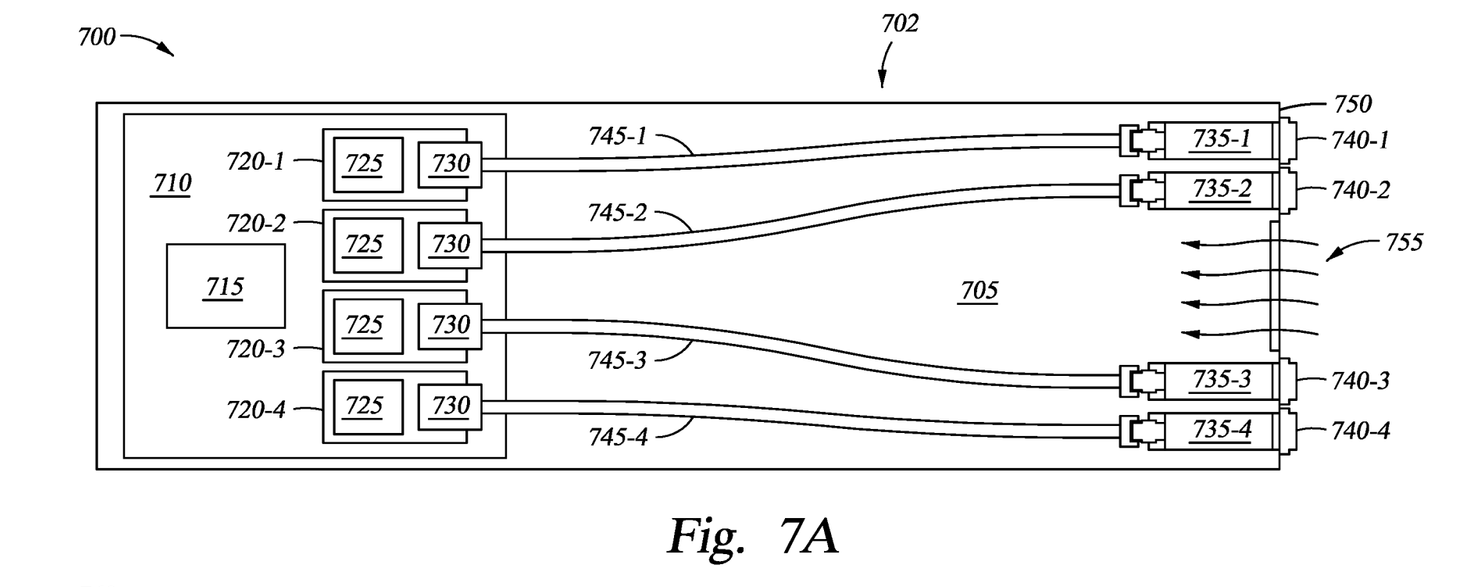
FIGS. 7A and 7B provide views of a network device with multiple laser module units, according to one or more embodiments.
Figure 7B:
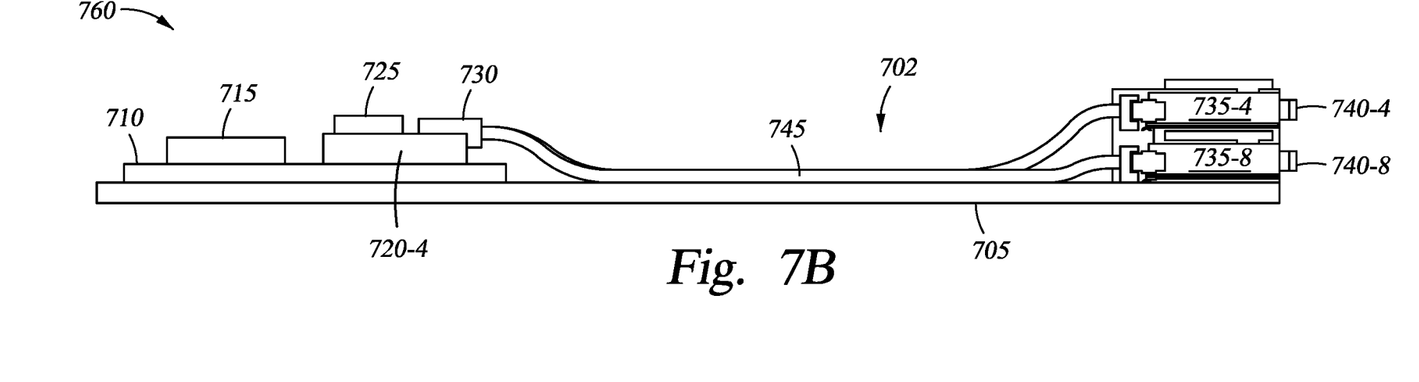

FIGS. 7A and 7B provide views of a network device 702 with multiple pluggable optical modules 740-1, ..., 740-8, according to one or more embodiments. More specifically, diagram 700 of FIG. 7A provides a top view of the network device 702 (showing pluggable optical modules 740-1, ..., 740-4), and diagram 760 of FIG. 7B provides a side view of the network device 702 (showing pluggable optical modules 740-4, 740-8). The features illustrated in diagrams 700, 760 may be used in conjunction with other embodiments. For example, the network device 702 represents one possible implementation of the host devices illustrated in FIGS. 2 and 3.

In the diagram 700, the network device 702 comprises a host PCB 705, and a substrate 710 arranged on the host PCB 705. In some embodiments, the substrate 710 comprises a silicon substrate, although other implementations of the substrate 710 are also contemplated. An application-specific integrated circuit (ASIC) 715 (e.g., a host processor) and a plurality of photonic dies 720-1, ..., 720-4 are arranged on the substrate 710. A respective electronic die 725 is arranged on each photonic die 720-1, ..., 720-4. Each of the ASIC 715, the plurality of photonic dies 720-1, ..., 720-4, and the electronic dies 725 may provide any suitable functionality for processing electrical signals and/or optical signals.

A respective fiber array unit (FAU) 730 is arranged on each photonic die 720-1, ..., 720-4. The FAUs 730 attach to respective optical fibers 745-1, ..., 745-4 and position the optical fibers 745-1, ..., 745-4 to optically couple with optical waveguides or other optical components formed in the respective photonic dies 720-1, ..., 720-4. Each of the optical fibers 745-1, ..., 745-4 may represent a respective one or more optical fibers, which may be single mode optical fiber(s) and/or multicore optical fiber(s).

The network device 702 further comprises a plurality of receptacles 735-1, ..., 735-8 that are each configured to receive a respective pluggable optical module 740-1, ..., 740-8. In some embodiments, each of the receptacles 735-1, ..., 735-8 may be configured as shown in FIG. 2 or 3 and described above. Each of the optical fibers 745-1, ..., 745-4 extends from the FAUs (730) to a respective receptacle 735-1, ..., 735-4, such that the pluggable optical modules 740-1, ..., 740-8 are optically coupled with the photonic dies 720-1, ..., 720-4.

The pluggable optical modules 740-1, ..., 740-8 may provide any suitable functionality, such as a laser module unit as shown in FIGS. 4A, 4B, an optical conditioning unit as shown in FIGS. 5A, 5B, a hybrid laser module and optical conditioning unit as shown in FIG. 6, and so forth. In some embodiments, each of the pluggable optical modules 740-1, ..., 740-8 comprises one or more external optical connectors that are arranged at the faceplate 750 when the pluggable optical modules 740-1, ..., 740-8 are plugged into the respective receptacles 735-1, ..., 735-8. The external optical connectors may transmit optical signals to, and/or receive optical signals from, one or more external optical devices.

In some embodiments, the plurality of receptacles 735-1, ..., 735-8 are arranged at the faceplate 750 (e.g., one or more cages 305 of FIG. 3) to define one or more air intake regions 755 at the faceplate 750. As shown in the diagram 700, the air intake region 755 is positioned between the receptacles 740-2, 740-3, although other positioning is also contemplated. In other embodiments, the faceplate 750 need not define an air intake region 755 as large as shown in the diagram 700. In some embodiments, the faceplate 750 may include one or more additional external optical connectors arranged between the receptacles 740-2, 740-3 (or elsewhere along the faceplate 750). In one example configuration, the pluggable optical modules 740-1, ..., 740-8 may be configured as laser module units that provide optical energy to the photonic dies 720-1, ..., 720-4. Based on signals received from the host PCB 705, the ASIC 715, and/or the electronic dies 725, the photonic dies 720-1, ..., 720-4 provide optical signals (e.g., modulated signals) to the additional external optical connectors.

FIGS. 8A-8D illustrate a sequence of assembling and coupling a host-side connector assembly with connectors of a pluggable optical module, according to one or more embodiments. The features in diagrams 800, 840, 850, 885 may be used in conjunction with other embodiments, e.g., to assemble the host device shown in FIG. 2 or 3.

Figure 8A:
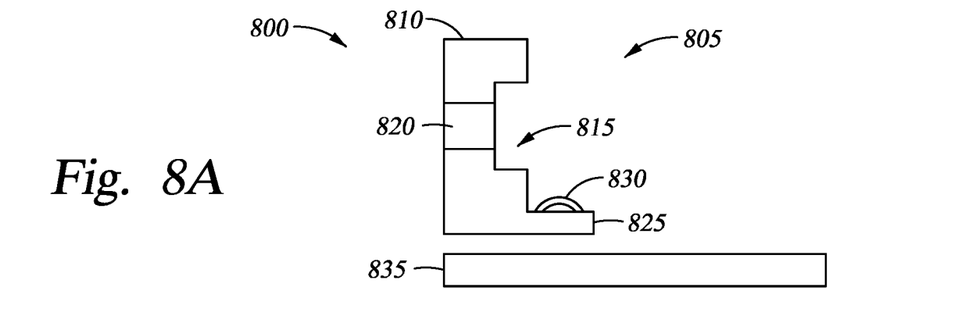
FIGS. 8A-8D illustrate a sequence of assembling and coupling a host-side connector assembly with connectors of a pluggable optical module, according to one or more embodiments.

In the diagram 800, a connector 805 is separate from a PCB 835 (e.g., the host PCB 240 of FIGS. 2, 3). In some embodiments, the connector 805 comprises a blind mate optical connector. The connector 805 comprises a body 810 that defines a recess 815 from a first lateral surface. An opening 820 extends from the recess 815, through the body 810, to a second lateral surface opposite the first lateral surface.

The connector 805 further comprises a horizontal projection 825 that forms a bottom surface of the connector 805. The horizontal projection 825 extends laterally from the first lateral surface. An electrical contact 830 extends from a top surface of the horizontal projection 825. Although not visible in the diagram 800, one or more additional electrical connectors may extend from the top surface of the horizontal projection 825. In some embodiments, the electrical contact 830 is elastically biased.

Figure 8B:
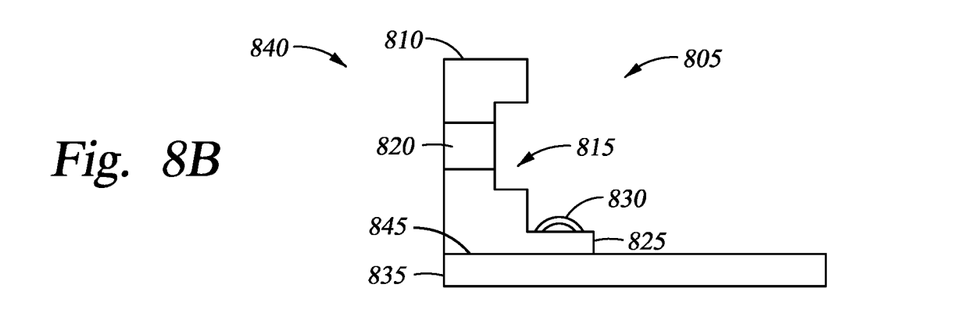

In the diagram 840, a bottom surface of the connector 805 is attached to a top surface of the PCB 835 using any suitable techniques. Attaching the connector 805 to the PCB 835 electrically couples the one or more electrical contacts 830 with contacts of the PCB 835 along an electrical interface 845.

Figure 8C:
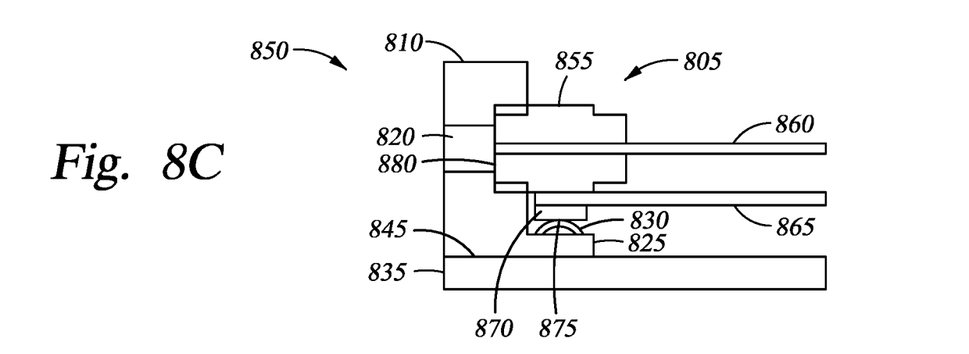

In the diagram 850, a pluggable optical module is inserted into the host-side connector assembly. On the pluggable optical module, a blind mate optical connector 855 is attached to a top surface of a module PCB 865, and an electrical contact 870 is arranged at a bottom surface of the module PCB 865. The blind mate optical connector 855 is attached to an optical fiber 860.

A forward edge of the blind mate optical connector 855 is received into the recess 815 of the connector 805. In some embodiments, the blind mate optical connector 855 contacts the connector 805 along a connector interface 880, which aligns the optical fiber 860 with the opening 820 extending through the body 810. The electrical contacts 870 contacts the electrical contact 830 along an electrical interface 875. In some embodiments, the compliance of the electrical contact 830 accommodates the alignment of the connector 805 with the blind mate optical connector 855. In some embodiments, the blind mate optical connector 855 may be retained by the connector 805 in the contacting relationship, e.g., using latch(es) formed in the connector 805, an applied adhesive, and so forth.

Figure 8D:
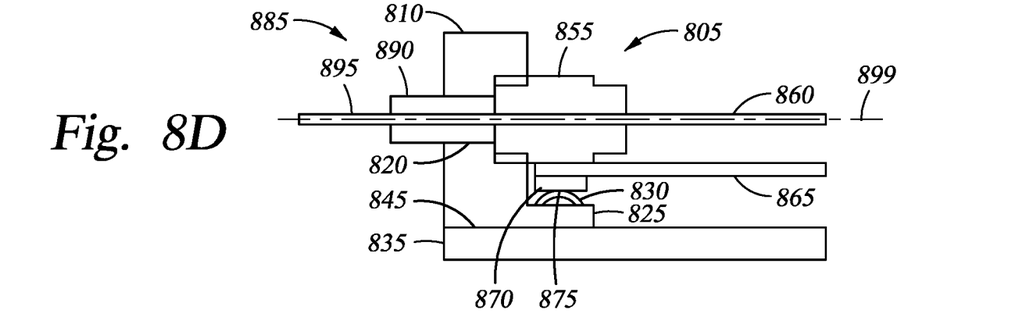

In diagram 885, a ferrule 890 is attached to an optical fiber 895. The ferrule 890 is received into the opening 820 and contacts the forward edge of the blind mate optical connector 855. In other embodiments, one or more features of the connector 805 (e.g., dimensioning of the opening 820) may limit the forward travel of the ferrule 890. In the contacting relationship, the optical fiber 895 is aligned with the optical fiber 860 along the optical axis 899. In some embodiments, the ferrule 890 may be retained by the connector 805 in the contacting relationship, e.g., using latch(es) formed in the connector 805, an applied adhesive, and so forth.

Although the sequence of diagrams 850, 885 illustrates the connection of the blind mate optical connector 855 to the connector 805 before the connection of the ferrule 890 to the connector 805, an alternate sequence may connect the ferrule 890 to the connector 805 before connecting the blind mate optical connector 855 to the connector 805.

Figures 9, 10:
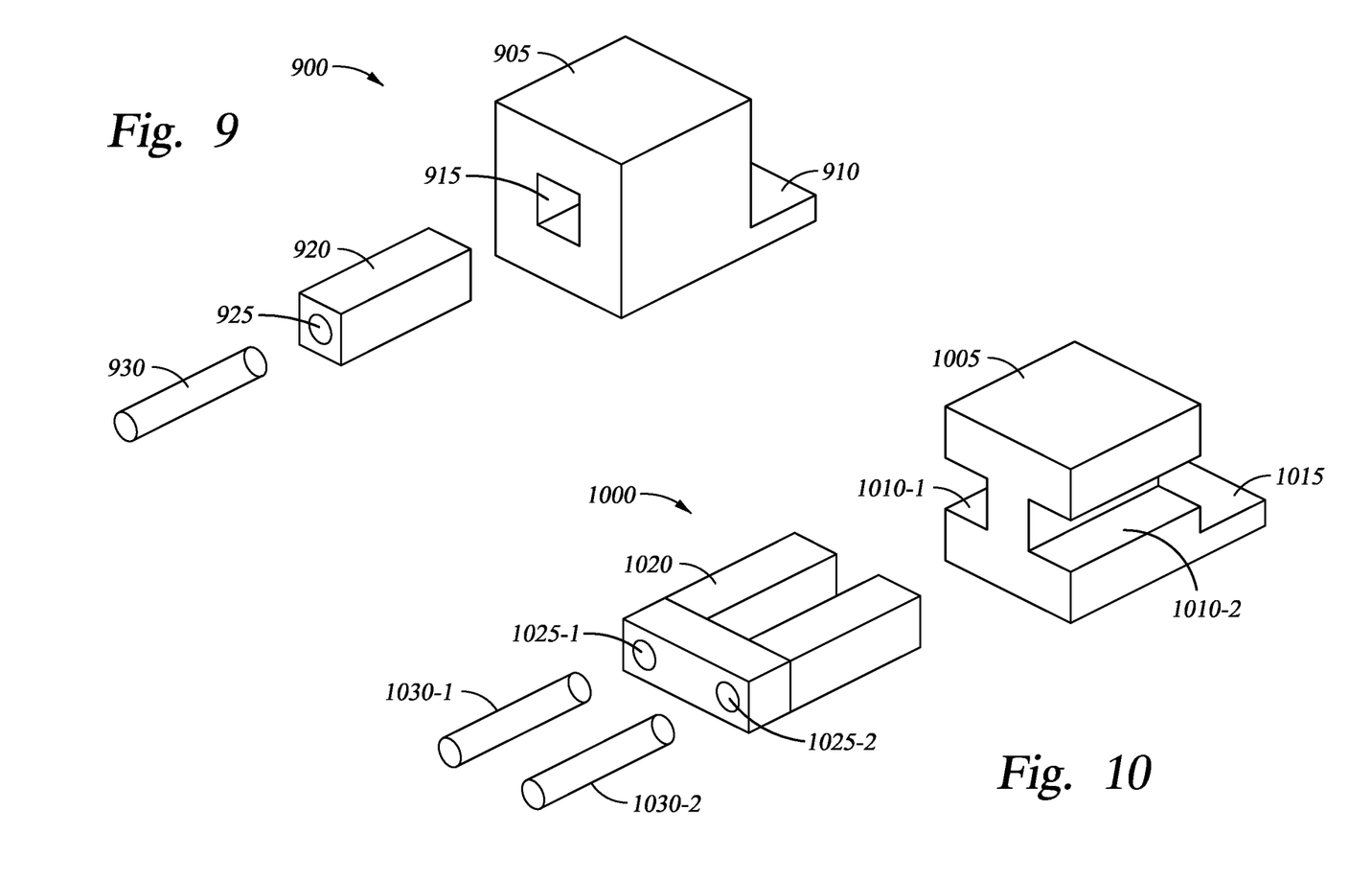
FIG. 9 illustrates a connector assembly having an opening through an endface, according to one or more embodiments.
FIG. 10 illustrates a connector assembly having an I-shaped endface, according to one or more embodiments.

FIG. 9 illustrates a connector assembly having an opening through an endface, according to one or more embodiments. The features in diagram 900 may be used in conjunction with other embodiments, e.g., to assemble the host-side connector assembly as shown in FIGS. 8A-8D.

In the diagram 900, an electrical connector 905 has an opening 915 through an endface of the electrical connector 905. Although the external contour of the electrical connector 905 and the opening 915 are square-shaped, alternative shapes are also contemplated. The electrical connector 905 further comprises a horizontal projection 910. Although not shown, in some embodiments one or more electrical contacts extend from a top surface of the horizontal projection 910. The one or more electrical contacts may be coupled with electrical contacts of a PCB when the electrical connector 905 is attached to the PCB.

An optical connector 920 may operate as a ferrule, defining an opening 925 that receives an optical fiber 930. The optical fiber 930 may be attached to the optical connector 920, e.g., using an applied adhesive. The optical connector 920 may be received into the electrical connector 905 through the opening 915. Although the optical connector 920 is shown as having a square-shaped external contour, the optical connector 920 may have any suitable shaping that corresponds to the contour of the opening 915. The optical connector 920 may be retained in the contacting relationship with the electrical connector 905 using latches, adhesive, and so forth. The optical fiber 930 may couple with a blind mate optical connector (e.g., of a pluggable optical module) through the opening 915.

FIG. 10 illustrates a connector assembly having an I-shaped endface, according to one or more embodiments. The I-shaped endface may alternately be described as an H-shaped interface. The features in diagram 1000 may be used in conjunction with other embodiments, e.g., to assemble the host-side connector assembly as shown in FIGS. 8A-8D.

In the diagram 1000, an electrical connector 1005 has an I-shaped endface and defines openings 1010-1, 1010-2. The electrical connector 1005 further comprises a horizontal projection 1015. Although not shown, one or more electrical connectors may extend from a top surface of the horizontal projection 1015. The one or more electrical connectors may be coupled with electrical contacts of a PCB when the electrical connector 1005 is attached to the PCB.

An optical connector 1020 may operate as one or more ferrules for one or more optical fibers, and as shown, the optical connector 1020 defines openings 1025-1, 1025-2 that receive respective optical fibers 1030-1, 1030-2. The optical fibers 1030-1, 1030-2 may be attached to the optical connector 1020, e.g., using an applied adhesive. As shown, the optical connector 1020 is U-shaped and is received through the openings 1010-1, 1010-2 (i.e., received around the web of the electrical connector 1005). The optical connector 1020 may be retained in the contacting relationship with the electrical connector 1005 using latches, adhesive, and so forth. The optical fibers 1030-1, 1030-2 may couple with a blind mate optical connector (e.g., of a pluggable optical module) around the I-shaped endface.

Other implementations of the electrical connectors 905, 1005 and the optical connectors 920, 1020 are also contemplated. In some embodiments, the optical connectors 920, 1020 include electrical contacts that couple with corresponding electrical contacts of the electrical connectors 905, 1005 when the optical connectors 920, 1020 are received. For example, the optical connectors 920, 1020 may include electrical contacts along outer surface(s) of the optical connectors 920, 1020 that couple with electrical contacts of the electrical connectors 905, 1005 exposed at the openings 915, 1010-1, 1010-2. Thus, the electrical contacts of the optical connectors 920, 1020 may be coupled, through the electrical connectors 905, 1005, with electrical contacts of a PCB or of a blind mate optical connector.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A pluggable optical device comprising:
a housing;
a printed circuit board (PCB) within the housing;
one or more blind mate optical connectors attached to the PCB along a first end of the PCB;
one or more electrical contacts of the PCB near the first end;
one or more external optical connectors arranged near a second end of the PCB opposite the first end; an electronic component attached to the PCB; and
one or more optical components attached to the PCB and included in optical paths between the one or more external optical connectors and the one or more blind mate optical connectors.

2. The pluggable optical device of claim 1,
wherein the one or more blind mate optical connectors are attached to a top side of the PCB, and
wherein the one or more electrical contacts are arranged at a bottom side of the PCB.

3. The pluggable optical device of claim 2, wherein the one or more electrical contacts comprise an edge connector configured to couple with elastically-biased contacts of a host device.

4. The pluggable optical device of claim 1, wherein one or more external optical connectors comprise two external optical connectors in a stacked configuration.

5. The pluggable optical device of claim 1, wherein the one or more optical components comprise a fanout device, the pluggable optical device further comprising:
a plurality of single mode optical fibers that couples the fanout device with a first connector of the one or more external optical connectors; and
a multicore optical fiber that couples the fanout device with a second connector of the one or more blind mate optical connectors.

6. The pluggable optical device of claim 1, further comprising:
one or more remote laser sources coupled with at least one connector of the one or more blind mate optical connectors.

7. The pluggable optical device of claim 1, wherein the one or more optical components comprise:
one or more active optical components that receive electrical power via the one or more electrical contacts; or
one or more passive optical components.

8. The pluggable optical device of claim 7, wherein the one or more active optical components or one or more passive optical components comprise one or more of:
an optical amplifier;
an optical attenuator;
an optical filter;
an optical dispersion controller;
an optical multiplexer;
an optical demultiplexer;
an optical switch; and
an optical repeater.

9. An optical system comprising:
a printed circuit board (PCB);
a photonic integrated circuit (IC) attached to the PCB;
an electronic component attached to the PCB;
a cage attached to the PCB along a first end of the PCB; and
a connector assembly configured to, when a pluggable optical device is received in the cage:
  couple with a plurality of blind mate optical connectors arranged along a second end of the pluggable optical device, wherein one or more optical components of the pluggable optical device are coupled with the photonic IC; and
  couple with one or more electrical contacts arranged near the second end.

10. The optical system of claim 9, further comprising:
one or more optical fibers that couple the connector assembly with the photonic IC.

11. The optical system of claim 10, further comprising:
a fiber array unit that arranges the one or more optical fibers to couple with the photonic IC.

12. The optical system of claim 9, wherein the cage is configured to receive two pluggable optical devices in a stacked configuration.

13. The optical system of claim 12, further comprising:
one or more heat sinks attached to the cage and configured to thermally couple with the two pluggable optical devices.

14. The optical system of claim 9, wherein the connector assembly comprises:
an electrical connector attached to the cage and having an opening through an endface; and
an optical connector configured to couple, through the opening, with a first blind mate optical connector of the plurality of blind mate optical connectors.

15. The optical system of claim 9, wherein the connector assembly comprises:
an electrical connector attached to the cage and having an I-shaped endface; and
an optical connector configured to couple, around the I-shaped endface, with a first blind mate optical connector of the plurality of blind mate optical connectors.

16. The optical system of claim 9, wherein the cage is one of a plurality of cages attached to the PCB along the first end, the optical system further comprising:
a faceplate at the first end, wherein each cage of the plurality of cages is configured to receive one or more pluggable optical devices through the faceplate,
wherein the plurality of cages are arranged at the faceplate to define one or more air intake regions at the faceplate.

17. The optical system of claim 9, wherein the pluggable optical device further comprises:
one or more remote laser sources coupled with at least one connector of the plurality of blind mate optical connectors,
wherein the one or more remote laser sources receive electrical power via the one or more electrical contacts.

18. The optical system of claim 9, wherein the pluggable optical device further comprises:
one or more external optical connectors arranged near a third end of the pluggable optical device opposite the second end; and
one or more optical components included in optical paths extending between the one or more external optical connectors and the plurality of blind mate optical connectors.

19. The optical system of claim 18, wherein the one or more optical components comprise a fanout device, the pluggable optical device further comprising:
a plurality of single mode optical fibers that couples the fanout device with a first connector of the one or more external optical connectors; and
a multicore optical fiber that couples the fanout device with a second connector of the plurality of blind mate optical connectors.

20. The optical system of claim 18, wherein the one or more optical components comprise one or more active optical components that receive electrical power via the one or more electrical contacts.

* * * * *